United States Patent [19]
Gieseke et al.

[11] Patent Number: 5,685,345
[45] Date of Patent: Nov. 11, 1997

[54] REINFORCING STRUCTURE FOR CONDUIT; AND METHOD

[75] Inventors: Steven S. Gieseke, Richfield; Thomas A. Boeckermann, Lakeville; Larry R. Nepsund, Savage, all of Minn.

[73] Assignee: Donaldson Company, Inc., Minneapolis, Minn.

[21] Appl. No.: 576,221

[22] Filed: Dec. 21, 1995

[51] Int. Cl.$^6$ ........................................ F16L 9/14
[52] U.S. Cl. ................ 138/172; 138/109; 138/96 R; 285/55; 285/397
[58] Field of Search ............... 138/172, 109, 138/97, 96 R, 177, 178, DIG. 6; 285/239, 920, 397, 370, 55, 53

[56] References Cited

U.S. PATENT DOCUMENTS

| | | | |
|---|---|---|---|
| 3,615,984 | 10/1971 | Chase | 138/97 X |
| 4,335,753 | 6/1982 | Frye | 138/109 |
| 4,468,309 | 8/1984 | White | 285/55 X |
| 4,556,240 | 12/1985 | Yoshida | 138/109 X |
| 4,652,020 | 3/1987 | Gilroy | 285/55 X |
| 5,383,688 | 1/1995 | Berry | 285/55 X |
| 5,406,983 | 4/1995 | Chambers et al. | 138/109 |
| 5,520,221 | 5/1996 | Meier | 138/109 |

*Primary Examiner*—Patrick Brinson
*Attorney, Agent, or Firm*—Merchant, Gould, Smith, Edell, Welter & Schmidt

[57] ABSTRACT

Air conduit construction is provided. The construction generally comprises a conduit section having an open end; and, a support member positioned inside of the conduit section open end. In preferred arrangements, the conduit construction has two open ends, with a reinforcing member in each of the open ends. In preferred arrangements, the reinforcing member includes a friction fit construction on an outer surface thereof. In typical and preferred embodiments, the friction fit construction includes a bead on the reinforcing member. A method of preparing air conduit constructions is also provided.

9 Claims, 3 Drawing Sheets

5,685,345

REINFORCING STRUCTURE FOR CONDUIT; AND METHOD

FIELD OF THE INVENTION

The present invention relates to conduits, in particular air flow conduits. It specifically relates to conduit constructions including sections comprising relatively inexpensive, polymeric materials such as high density polyethylene (HDPE). The invention relates to reinforcing certain portions of such arrangements, which must withstand pressures exerted for arrangements such as clamps, during use.

BACKGROUND OF THE INVENTION

Air flow transfer systems such as used between the air filter constructions and engine intake manifolds in equipment such as trucks, automobiles and construction equipment, generally involve a use of conduits which are attached to the various equipment by clamp arrangements. In some instances, the conduits are prepared in sections, and the sections are also attached to one another by clamp arrangements. In some systems the conduits comprise curved extensions, for accommodating direction of air flow along a nonlinear path.

In typical systems, a conduit section is secured to a construction such as another conduit section, an intake manifold, or an air flow exit from a piece of equipment such as an air filter assembly, through use of a flexible hose and hose clamp arrangement. In general, a hose section is pushed over an end portion of the air flow conduit, and a ring clamp is fitted around the outside. The ring clamp (or hose clamp), is appropriately tightened to compress the flexible hose section over the more rigid conduit section. A seal is generally maintained, through utilization of a soft polymeric material (typically rubber) as the outer hose section.

In general, especially with respect to air flow systems between the air filter assembly and the air intake manifold of a truck, the air flow conduit section (or sections) is made from metal such as stainless steel or aluminum. The relatively rigid metal sections are strong, and can withstand the forces of the clamping, during sealing with flexible hose sections.

In some arrangements, the conduit sections comprise molded polymeric material. When such has been the case, in general reinforced polymeric materials which are relatively rigid, and which can readily withstand the forces of clamping, are used. Typically the air flow conduit sections of such arrangements comprise blow molded nylon material.

The present invention concerns improvements in such arrangements; and, methods for achieving improvements in methods of use.

SUMMARY OF THE INVENTION

According to the present invention, an air conduit construction is provided. The air conduit construction generally comprises a conduit section and a support or reinforcing member. The conduit section generally has an open end and an inner surface. The support member is generally positioned inside of the open end of the conduit section, in a manner engaging the inner surface of the conduit section. Preferably the support member includes a friction fit construction, for example a protrusion or member, on an outer surface thereof, for engagement with the inner surface of the conduit section so that the support member is secured within the conduit section and does not readily slide with respect thereto. In preferred arrangements, the friction fit member comprises an annular seal bead. However, it may comprise one or more perturbances on the outer surface of the support member.

The arrangement is particularly well adapted for use with conduit sections comprising industrial, low grade, high density polyethylene, and support members comprising glass-filled nylon. In this manner, the conduit section may be constructed from relatively inexpensive materials, and can be made using rotational molding techniques. It is foreseen that in a typical, preferred, embodiment, the support member will comprise a blow-molded piece.

In certain preferred applications, the support member will have a circular construction and an inner surface taper to facilitate air flow.

According to the present invention and preferred method of providing air conduit assemblies or constructions is provided. In general the method will comprise rotational molding of a high density polyethylene conduit member, having at least one open end. The conduit member will be provided at a temperature such that the open end is expanded, relative to its condition at ambient. While the open end of the conduit member is expanded, support member will be inserted into the expanded conduit member open end. After the step of insertion, the open end will be allowed to cool and contract, to snugly engage the support member. Relative dimensions will be chosen, such that after the cooling process, a secure attachment of the support member within the conduit member occurs. The overall arrangement can then be assembled in an air flow conduit system, with a hose clamp around an outer surface of the conduit member. The hose clamp or T-clamp can be tightened over a region involving the reinforcing member, without undesirably crushing the arrangement.

DETAILED DESCRIPTION

Figure 1:
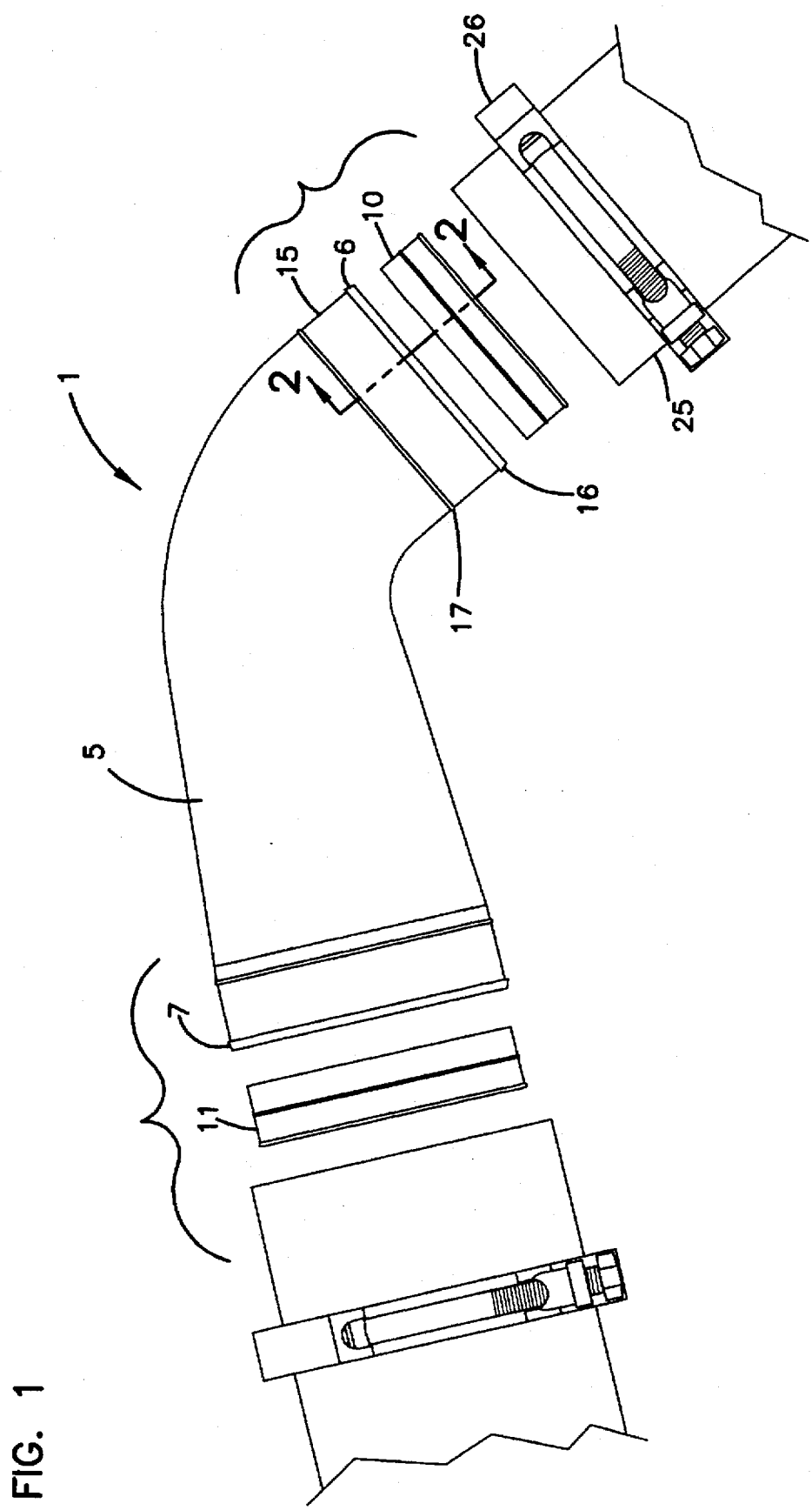
FIG. 1 is a fragmentary exploded view of an air flow conduit according to the present invention extending between two sections of conventional hosing, with clamps.

In general, it is desirable to reduce cost (and weight) in association with preparation of components in air flow transfer systems, especially those associated with vehicles, such as trucks, automobiles, and various transport for construction equipment. With respect to conduit systems such as those extending between air filter arrangements and air intake manifolds, it is desirable if possible to avoid metal constructions, such as aluminum, because they are made from relatively expensive materials and require metal working, for construction.

Also, it is preferable to try to avoid the utilization of large sections of nylon or nylon reinforced materials, in these members, since such polymers are relatively expensive and in some instances are relatively heavy. Also, it is preferable to avoid blow molding techniques, if possible, since tooling for such equipment and conduits made by such operations and relatively expensive, by comparison to certain other types of molding techniques and products made thereby.

In general, when possible it is desirable to utilize a polymeric material such as high density polyethylene (HDPE), in components for equipment. High density polyethylene is a widely available low grade industrial plastic, and it is relatively inexpensive. In addition, components such as conduit sections can be readily prepared from high density polyethylene using relatively inexpensive tooling and molding techniques, such as for example through rotational molding operations.

In the past, materials such as high density polyethylene were not generally utilized in duct sections extending between arrangements such as air filter assemblies and engine intake manifolds. A reason is that connections with these various pieces of equipment, involving flexible hoses and clamps, could not readily be utilized in connection with high density polyethylene parts. The reason for this is that in general such arrangements are sealed with T-bolt or circular hose clamps, and when such arrangements are tightened, especially when utilizing power equipment, the pressures placed on the underlying high density polyethylene component are too great for the component to withstand. That is, in general the components can crush or become undesirably distorted under such pressures.

The present invention concerns the provision of reinforcement to certain sections of conduit components such as components made from high density polyethylene, to alleviate such types of concern. While the techniques described herein may be applied in a wide variety of systems, they are particularly well adapted for use in air conduits having generally circular cross-sections, and having an internal diameters within the range of about 2 inches to 10 inches, typically 4 inches or greater. These are relatively large arrangements, since they handle air flow such as air intake flow for truck engines or similar equipment. Because they are relatively large, it is highly advantageous to reduce cost by using relatively inexpensive, high density polyethylene for molding of the parts, or a similar material. In addition, the types of equipment involved are in wide use and, thus, it is advantageous to provide arrangements that can be readily prepared utilizing relatively inexpensive mass manufacturing techniques.

Referring to FIG. 1, reference numeral 1 generally designates an air conduit construction or assembly according to the present invention. Air conduit construction 1 comprises tubular conduit section 5 having first and second opposite open ends 6 and 7. Conduit construction 1 further includes reinforcing members 10 and 11 positioned in ends 6 and 7, respectively.

In FIG. 1, construction 1 is shown with reinforcing members 10 and 11 "exploded" from their assembled position. In general use, they will be permanently positioned and secured within ends 6 and 7, respectively. With respect to this, attention is directed to FIG. 2.

Figure 2:
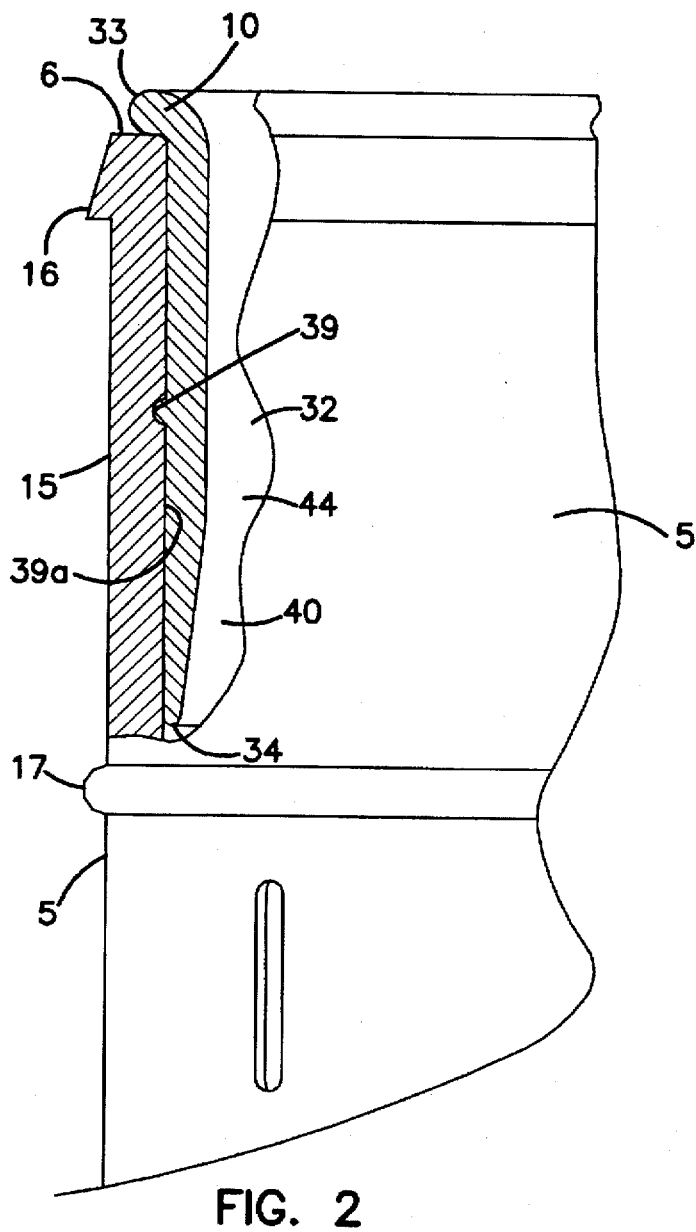
FIG. 2 is an enlarged, fragmentary, partially cross-sectional view taken generally along line 2—2, FIG. 1.

In FIG. 2, assembly 1 is depicted, with portions in cross-section, and reinforcing member 10 is viewable permanently positioned within end 6 of conduit section 5.

Referring again to FIG. 1, in general when air conduit construction 1 is positioned within an overall assembly, it is secured therein by conventional means, as indicated. More specifically, conduit section 5 includes, adjacent end 6, an outer sealing surface 15, between ribs 16 and 17. In use, flexible hose 25 is pushed over outer sealing section 15, and T-bolt or clamp ring 26 is positioned around both the hose 25 and outer sealing section 15, generally between ribs 16 and 17. When T-bolt or clamp 26 is tightened, hose 25 is compressed against outer sealing section 15, forming a seal. It will be understood, from reference to FIG. 2, that, in general, outer sealing section 15 is in a portion of conduit section 5 reinforced by reinforcing member 10. Thus, pressure applied by T-bolt 26, when tightened, is taken by both outer sealing section 15 and reinforcing member 10.

As a result of the construction shown in FIGS. 1 and 2, a material which cannot itself fully withstand forces applied by T-bolt 26, can be utilized for conduit section 5. In particular, conduit section 5 may comprise such a polymeric material as inexpensive high density polyethylene, which cannot normally be utilized for arrangements sealed with the manner shown in FIG. 1. This is accomplished, by providing reinforcing member 10 of appropriate material. In general, reinforcing member 10, when utilized in association with a high density polyethylene conduit section 5, is preferably a strong polymeric material such as a glass-reinforced nylon.

Attention is now directed to end 7 of section 5. End 7 includes features generally analogous to features 15, 16 and 17, at end 6. Reinforcing member 11 is constructed and arranged to operate analogously, with respect to end 7, as does reinforcing member 10 at end 6.

Figure 4:
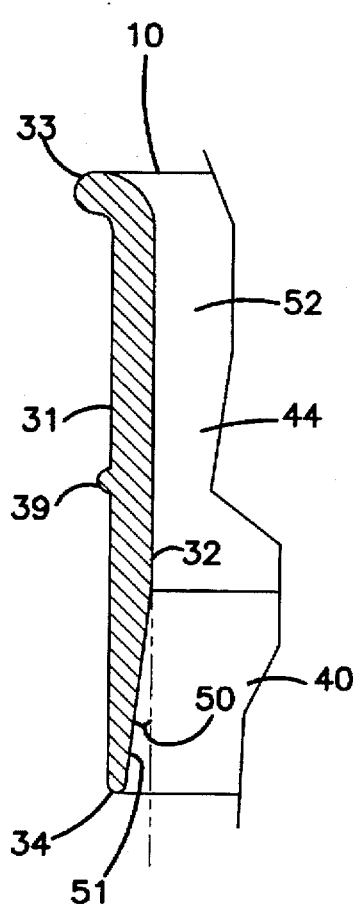
FIG. 4 is a fragmentary cross-sectional view taken generally along line 4—4, FIG. 3.
Figure 3:
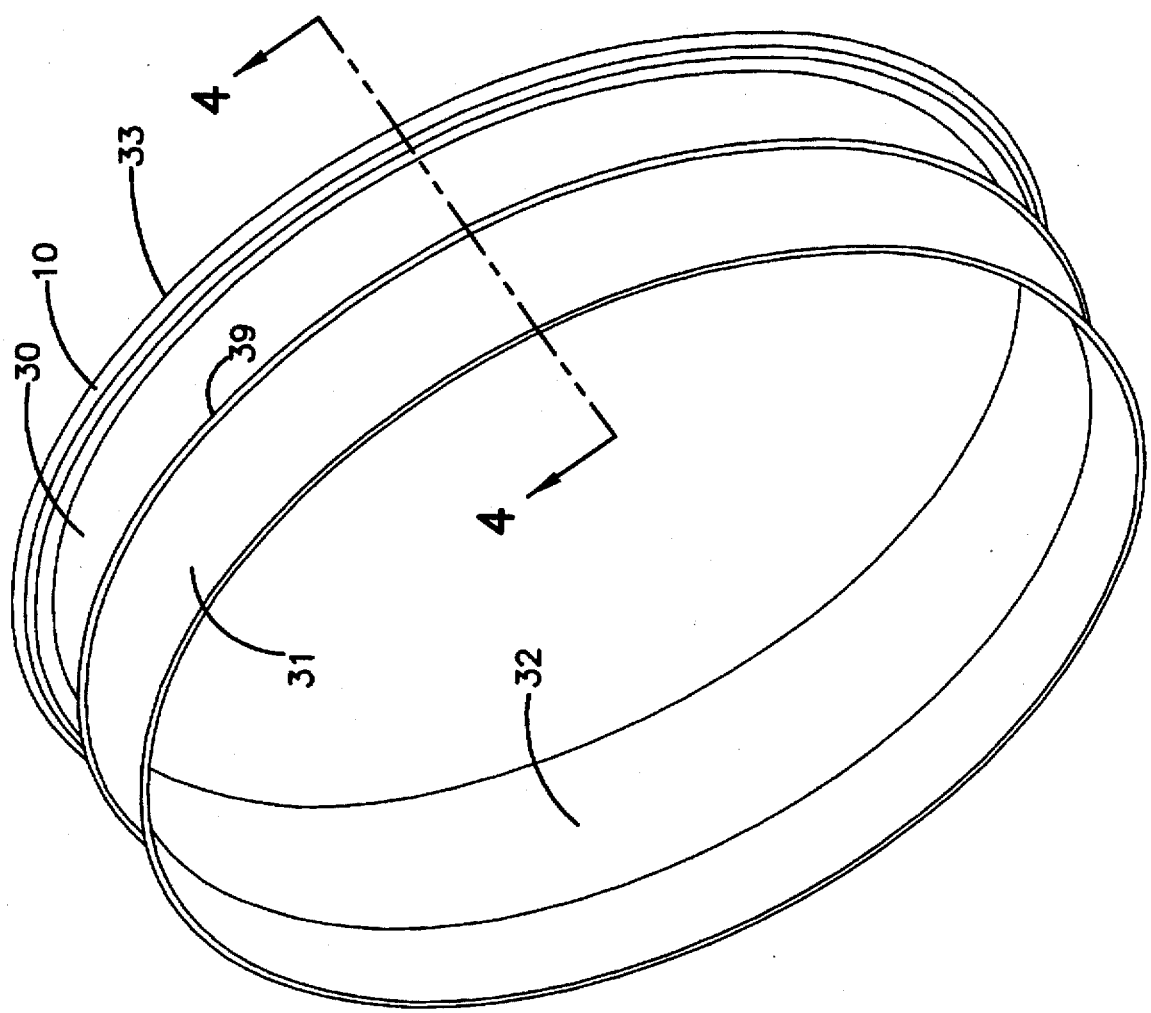
FIG. 3 is an enlarged perspective view of a support ring construction utilized in the assembly of FIG. 1.

Attention is now directed to FIGS. 3 and 4. In general, reinforcing member 10 comprises a ring 30 having outer circumferential surface 31, inner surface 32, an outer end edge comprising outer rib 33, and inner edge 34.

Preferably, a friction fit construction member or bead construction is positioned on surface 31, to facilitate retention of the reinforcing member 10 within conduit section 5, during assembly. For the arrangement shown in FIGS. 3 and 4, the bead construction comprises centrally positioned outer bead 39. Bead 39, in the preferred embodiment depicted, is aligned in a plane generally perpendicular to a central longitudinal axis of member 10; and, bead 39 is a continuous annular bead, in extension.

In general, during assembly, conduit section 5 is manufactured from molded material such as high density polyethylene. Before the material cools (or if the assembly is conducted after section 5 cools, end 6 would be reheated), reinforcing member 10 is positioned to extend within end 6, while end 6 of conduit section 5 is hot and expanded. That is, during assembly conduct section 5 is provided hot and expanded, relative to ambient (ambient typically being about 25° C.). Typically end 6 should be heated sufficiently to be expandable 0.5–1.0% in diameter, relative to ambient. As end 6 cools, it will contract and tighten around reinforcing member 10, provided appropriate relative dimensions of reinforcing member 10 in conduit section 5 are selected. When this occurs, bead 39 will become pressed into conduit section 5, providing for a good friction fit that will not readily separate, in the absence of reexpansion of end 6 by heat. When it is said that it will not "readily separate", it is meant that preferably relative dimensions of Section 5 and member 10 are chosen such that after assembly member 10 cannot merely be slid into and out of member 5, at least with mere hand pressure. Rather, the bead construction 39 engages on inner surface 39a of the conduit member 5, FIG. 2.

It is noted that an air seal between reinforcing member 10 and the internal surface 39a of conduit section 5 is not essential, since in use hose 25 fits over them both.

In general, preferably reinforcing member 10 includes end rib 33, to facilitate assembly, as shown in FIG. 2. Generally ring 10 is inserted into end 6 of conduit section 5 until outer rib 33 engages conduit section 5.

As shown in FIGS. 2 and 4, preferably internal surface 32 of reinforcing member 10 is tapered in region 40, adjacent inner edge 34. Tapering in this region, facilitates smooth air flow and less turbulence, as air passes through this region of the overall construction 1. The tapering, then, is from a widest point intermediate outer end rib 33 and inner edge 34, toward a narrowest or thinnest portion generally adjacent to inner edge 34. Alternately phrased, the internal diameter (ID) of ring 30 increases, as one moves along surface 32 from central region 44 toward end edge 34. Preferably an even, linear, change in internal diameter is utilized along this location. Most preferably the angle of taper is about 4°–10°, most preferably about 7°. The term "angle of taper" in this context refers to the angle indicated generally at reference numeral 50, FIG. 4, and is the angle between tapered surface 51, and untapered surface 52. For typical systems, tapered surface 51 will extend inwardly, from inner edge 34, a distance of about 0.3–0.7 inches, preferably about 0.5 inches.

In typical preferred systems, the thickness of member 10, in region 44 where there is no taper (disregarding bead 39) will be about 0.06 inches to 0.12 inches, and preferably about 0.10 inches (i.e. 1.5–3.0 mm, preferably about 2.5 mm). The taper 51 will result in a region adjacent end 34 reducing in thickness at an angle of about 7°.

Attention is again directed to the arrangement shown in FIG. 1. In this arrangement, conduit section 1 tapers in internal and external diameter, between second end 7 and first end 6. Reinforcing members 10 and 11, then, will generally be of different internal and external diameters, from one another, each being sized to appropriately engage an associated end. In preferred systems, however, each will have the same wall thickness and length of extension between its outer rib and inner edge, and each will have the same dimensions in cross-section and angle of taper. From the following examples of dimensions for a working system to be installed in a truck, such as an over-highway tractor, general application will be readily understood.

Assume that conduit section 5 has an end 6 of about 127 mm in outside diameter. When construction 5 is made from high density polyethylene, preferably rotomolded, the internal diameter at this location will be about 120.5 mm, i.e., the wall thickness of conduit section 5 will generally be about 0.06 to about 0.12 inches, and preferably about 0.10 inches (i.e. 1.5–3.0 mm, preferably about 2.5 mm) throughout, except in locations such as where ribs 16 and 17 are positioned. The ribs 16 and 17 will typically have a relief of about 0.03 inches (0.75 mm) to 0.10 inches (2.5 mm). Typically region 15 and the analogous region at opposite end 7, will be molded smooth, whereas a remainder of the outside surface of Section 5 will be molded with a rough outer surface. To be slid into a portion of high density polyethylene which, at room temperature, has an internal diameter of about 120.5 mm, and to achieve a snug fit, preferably reinforcing ring 10 will have an outer diameter (i.e. surface 31 will have an outer diameter, disregarding beads 33 and 39), of about 120.75 mm. Bead 39 will preferably be molded to have a circular radius of about 0.03 inches (0.75 mm). Thus, the outer diameter of ring 10, at bead 39, will be about 127.3 mm.

For a preferred such arrangement, the distance between the outer edge or bead 33 and inner edge 34 will be about 1.5 inches, with bead 39 preferably positioned the same distance from inner edge 34 as from outer end rib 33. Preferably outer end rib 33 has a circular radius of about 0.05 inches (about 1.25 mm).

For the arrangement shown in FIG. 1, the outer diameter of end 7 is about 152.4 mm, and the internal diameter is about 146.1 mm. The reinforcing ring or member 11 at this location, would have an outer diameter, disregarding its central friction bead, of about 146.3 mm. Other features of the ring 11 would, in preferred constructions, be the same as for reinforcing member 10.

Although a wide variety of materials could be utilized for components and arrangements according to the present invention, the invention was developed to take specific advantage of certain readily available materials. In particular, it is preferred that high density polyethylene material be utilized for the conduit section 5, since such a material is a relatively inexpensive, low grade, material. One such usable high density polyethylene material is PAXON® 7204, a black 35 mesh cross linkable HDPE powder marketed for use in rotational molding applications and available from Allied, P.O. Box 53006, Baton Rouge, La. 70892. This material can be molded to provide an item which has a density (ASTM Test D 1505-85) of 0.944 g/cm$^3$; a tensile strength at yield (ASTM D638-84) of 3,000 psi; an elongation at break (ASTM D838-84) of 400%; a tensile modulus of elasticity (ASTM D638-84) of 80,000 psi; a flexural modulus (ASTM D790-84A) of 100,000 psi; a heat deflection temperature, 66 psi load (ASTM D648-82) of 138° F.; a Vicat softening temperature (ASTM D1525-82) of 248° F.; an impact brittleness temperature (ASTM D746-79) of <−180° F.; a dart impact (−40° C.) (ARM Std. (B), 125 mil thickness), of 60 ft-lb; and, an environmental stress crack resistance (ASTM D1693-70) of >1,000 hrs. The material will be usable in preferred conduit sections if molded generally according to the recommendations of the manufacturer, using conventional rotational molding techniques.

A wide variety of materials may also be utilized for the reinforcing members (10,11). Preferably the reinforcing members will comprise molded, glass-reinforced, nylon. A usable such material is available from The Hale Manufacturing Company, P.O. Box 327, Cedartown, Ga., under the trade designation HYLON™ 6/6, product No. 505G. This material is a 45% glass filled nylon 6/6, typically utilized to construct members through injection molding operations. It has a melt of 500° F. and a mold of 180° F. The physical properties of such materials are generally as follows: Melting point (ASTM D-789) 500° F.; specific gravity (ASTM D-792) 1.54 grams/cc; and relative viscosity (ASTM D-789) 50 CS. The mechanical properties of such molded materials are generally as follows: Tensile strength at yield (ASTM D-638), 27,000 psi; elongation at break (ASTM D-638), 7%; flexural strength (ASTM D-790), 34,000 psi; flexural modulus (ASTM D-790), 1,700,000 psi; Izod impact (notched) (ASTM D-256), 2.10 ft.lb./in.; hardness (Rockwell) (ASTM D-785), 90 (R-Scale).

In general, conventional molding techniques may be utilized for both parts. Assembly will generally be as follows: After the conduit section comprising high density polyethylene or similar material is manufactured, while it is still hot, an appropriate end section is cut and trimmed. The reinforcing member is slid into position, and the assembly is allowed to cool. The same operation will be conducted at both ends.

In the alternative, it may be desirable to apply heat to an end section of the conduit section, to cause it to expand, before the reinforcing member is slid into position.

In general, the ring should be constructed to provide a tight fit, however again an actual sealing between the two members is not required. If it is found that the rings are secure, but a little loose, a tightening can be accomplished by applying a hose clamp around the assembly while using a propane torch to heat the conduit material. This will cause the conduit section to shrink onto the reinforcing member, as it cools. If this type of operation is conducted, one should ensure than overheating does not occur since it may damage the parts.

What is claimed is:

1. An air conduit construction comprising:
   (a) a conduit section being of a cylindrical construction having first and second open ends at opposite ends of said cylindrical construction; said conduit section having an inner cylindrical surface extending between said first and second open ends; and
   (b) a support member positioned inside of said conduit section along a longitudinal extension between said first and second open ends; said support member having a circular cross-section along a complete length of said longitudinal extension between said first and second open ends; said support member including a friction fit construction comprising an annular seal bead on an outer surface thereof; said annular seal bead being located along said longitudinal extension between said first and second open ends; and said annular seal bead being adapted for engagement with said inner cylindrical surface.

2. A construction according to claim 1 wherein:
   (a) said conduit section comprises high density polyethylene; and
   (b) said support member comprises glass filled nylon.

3. A construction according to claim 1 wherein:
   (a) said support member comprises a circular ring having an outer surface, an inner surface, an inner edge and a central portion;
      (i) said support member inner surface having a tapered section, in thickness, extending between said central portion and said inner edge.

4. A construction according to claim 3 wherein:
   (a) said tapered section has an angle of taper within the range of 4°–10°.

5. A construction according to claim 4 wherein:
   (a) said conduit section comprises high density polyethylene; and,
   (b) said support member comprises glass filled nylon.

6. A construction according to claim 5 wherein:
   (a) said conduit section comprises a rotational molded high density polyethylene conduit member.

7. An air conduit construction comprising:
   (a) a conduit section being of a cylindrical construction having opposite first and second open ends; said conduit section having an inner cylindrical surface extending between said first and second open ends; and,
   (b) a support member positioned inside of said conduit section first open end and extending along a longitudinal extension between said first and second open ends;
      (i) said support member including a friction fit construction on an outer surface thereof, for engagement with said inner cylindrical surface of said conduit section; and
      (ii) said support member comprising a circular ring along a complete length of said longitudinal extension between said first and second open ends; said circular ring having an outer surface, an inner surface, an inner edge and a central portion; said support member inner surface having a tapered section, in thickness, extending between said central portion and said inner edge; said tapered section being located along said longitudinal extension between said first and second open ends.

8. A construction according to claim 7 wherein:
   (a) said tapered section has an angle of taper within the range of 4°–10°.

9. A construction according to claim 8 wherein:
   (a) said conduit section comprises high density polyethylene; and
   (b) said support member comprises glass filled nylon.

* * * * *

UNITED STATES PATENT AND TRADEMARK OFFICE
CERTIFICATE OF CORRECTION

PATENT NO. : 5,685,345

DATED : NOVEMBER 11, 1997

INVENTOR(S) : GIESEKE ET AL.

It is certified that error appears in the above-identified patent and that said Letters Patent is hereby corrected as shown below:

Column 4, line 1, "100" should read --10--.

Signed and Sealed this

Third Day of November, 1998

Attest:

BRUCE LEHMAN

Attesting Officer

Commissioner of Patents and Trademarks